Jan. 27, 1942.  E. HERZOG  2,270,877
INDUCTOR ALTERNATING CURRENT GENERATOR
Filed June 6, 1939
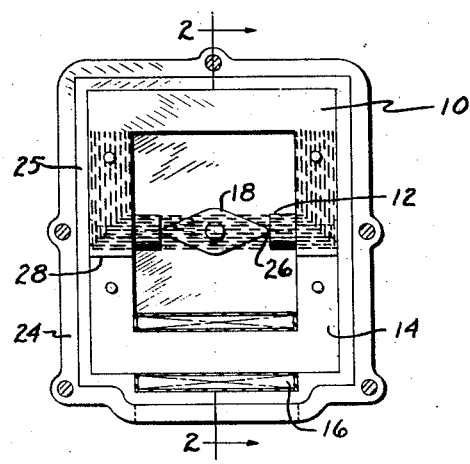
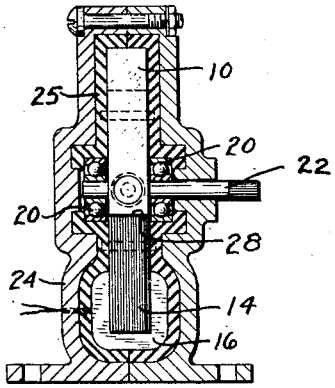
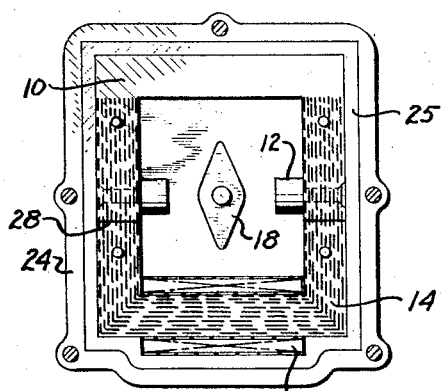
INVENTOR
EUGENE HERZOG
BY
ATTORNEYS Patented Jan. 27, 1942

2,270,877

UNITED STATES PATENT OFFICE 2,270,877

INDUCTOR ALTERNATING CURRENT GENERATOR

Eugene Herzog, Dayton, Ohio

Application June 6, 1939, Serial No. 277,683

1 Claim. (Cl. 171—209)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an alternating current generator of the inductor type.

It is the object of this invention to provide an alternating current generator of very light weight for small power applications.

It is a further object of this invention to provide such a generator of a construction particularly adapted for low cost production.

It is a further object of this invention to provide such a generator in a manner that will allow changes in design necessary for varying uses with a minimum interference in standardized production.

There are certain applications for electrical generators where the power output is small and therefore the maximum efficiency is not vital but where trouble free operation and consistency are of the greatest importance. Generators for electrical tachometers are an example of such an application. The output varies from a fraction of a watt to a few watts but it is very important that the generator require a minimum of maintenance and that its speed-voltage curve repeat consistently.

Direct current generators with a permanent magnet field used as tachometer generators have the disadvantages of brush and commutator troubles and are in certain locations badly affected by external magnetic fields. For this reason permanent magnet alternating current generators came into use, but they are objectionable in many respects, such as failure of the gears where built-in gear trains are used to give high speed operation; such as lack of consistency due to rotating permanent magnets which become easily demagnetized; and also they are expensive to manufacture and are not well adapted for voltage changes necessary for operation in various speed ranges. It is therefore a further object of my invention to provide a novel inductor generator which will eliminate such disadvantages.

Further objects will become apparent as the invention is described in the following specification taken in connection with the accompanying drawing in which:

Fig. 1 is a front elevational view showing parts in section and with a part of the housing removed of the generator embodying my invention;

Fig. 2 is a sectional view taken on the line 2—2 of Fig. 1; and

Fig. 3 is a view similar to Fig. 1 showing an operative position of the generator different from that shown in Fig. 1.

The inductor type generator as illustrated herein consists of a permanent magnet 10 provided with pole tips 12; a laminated soft iron core 14 forming with magnet 10 a closed magnetic circuit and on which is placed a winding 16; a laminated soft iron rotor 18 supported in bearings 20 and provided with a mechanical drive 22; the entire assembly is supported by the frame or housing 24 and is insulated therefrom by insulation 25. The air gap 26 allows rotation of the rotor in the field and the air gap 28 between the permanent magnet and the soft iron circuit is used to adjust the division of the magnetic flux.

The permanent magnet 10 is preferably made of a material of high coercive force such as the aluminum-nickel-cobalt alloys recently placed on the market as this allows a decrease in the size and it allows an increase in the gap length 26. Because the flux in the magnet is fluctuating, the magnet should be subdivided and with the subdivisions insulated from each other.

The pole pieces 12 permit a more complete interruption of the magnetic circuit through the rotor. They may be formed integral with the permanent magnet but it is preferred that they be built up of soft iron laminations and are attached to it.

Similarly the rotor 18 is preferably built up of thin laminations. During its rotation it alternately allows the magnetic flux to pass through it when it lies across the pole pieces and offers a high reluctance in the magnetic circuit one-half turn later. Magnetism therefore alternately builds up and dies down in it and unless it is well laminated there are large losses and great resistance to the passage of the magnetic flux through it. It is shown as a two pole rotor but may sometimes be made four or more pole especially for low speeds.

The rotor is driven by the shaft 30 which is supported by the bearings 20 and is provided with a suitable connection at its end 22 for attachment to the prime mover.

The laminated soft iron core 14 provides a magnetic path for the flux whenever it does not pass through the rotor. With a two pole rotor, for each turn of the rotor the flux will pass twice through the rotor and twice through the soft iron core thereby generating two cycles of alternating current in the coil 16 wound on the soft iron core. This will fix the frequency of the generated voltage but its magnitude will obviously depend on the strength of the permanent magnet, its material, and the relative dimensions of air gaps 26 and 28, respectively, which should be so relatively adjusted as to force as nearly as possible the entire flux through the coil and then shunt it out as fully as possible. This is accomplished by making the magnetic spacing between the lobes of the rotatable element and the poles in the maximum closed position thereof smaller than the magnetic spacing in gap 28, and greater than gap 28 in the maximum open position of the lobes. In the closed position the ratio of gap 28 to gap 26 shall be a maximum within the limitations of the necessary mechanical clearance in gap 26 and of excessive reluctance in gap 28. Likewise in the open position the ratio of magnetic spacings shall be a minimum. It will be obvious that various materials of high magnetic reluctance and high resistance may be used in place of air in gap 28 for fixing the desired relative magnetic spacing. The voltage will also depend on the number of turns in the coil.

It is suggested that for various voltage applications the entire unit be left unchanged and just various coils be provided. For tachometers designed for various speed ranges the change can be made by providing coils wound with suitable number of turns for that speed ranges. Where the same instrument may be used for various speed ranges this may be taken care of by tapped coils. Obviously all this is in addition to the standard method of varying the resistance of the indicator to change the range of speed indication.

It is inherent in the design of the generator that certain dimensions especially those affecting the air gaps must be held accurately in manufacture and during the useful life of the instrument. This can be achieved in the usual way by rigidly assembling the instrument and making careful provisions against future changes. However, whenever the amount of production warrants it, it is more desirable to mold the entire unit using any suitable plastic material for the frame. This not only gives the advantage of rigid and permanent alignment of the parts but gives a simpler and cheaper product of greater uniformity.

The inductor generator as illustrated has a closed magnetic circuit through the output coil and the magnet which is shown as a permanent magnet but may have outside excitation by a coil connected to a current source. The rotor by-passes or shunts this flux away from the coil and thereby causes a voltage to be induced in the coil. The closed magnetic field decreases the effects of external magnetic fields; it gives greater stability to the permanent magnet because the demagnetizing forces are smaller and with suitable design gives a higher voltage and a better wave shape than the conventional inductor generator which alternately closes and opens the magnetic circuit to establish and destroy the magnetic flux and thereby induces a voltage in the coil. The closed magnetic field therefore makes the generator more resistant to the effects of vibration in uses such as on airplane engines or in railway service. It will be understood that my invention is to be limited only by the scope of the appended claim.

I claim:

An alternating current generator of the inductor type comprising a closed magnetic circuit including a permanent magnet of high coercive force and an element of high magnetic permeability, an output coil associated with said element, a gap in said circuit having relatively low permeability, spaced pole tips on said permanent magnet, and a laminated rotor of high permeability having lobes capable of establishing a shunt magnetic circuit between said pole tips and around said element in one position of said rotor, said rotor including said lobes being elongated in one direction radial of the axis thereof to a length sufficient to substantially bridge said pole tips, said rotor including said lobes having a width in all parts considerably less than the spacing of said pole tips so that the magnetic spacing of said lobes in said shunt circuit is less than the magnetic spacing in said gap in said one position of said rotor, and considerably greater than the magnetic spacing in said gap in another position of said rotor, to thereby obtain a substantial variation in the magnetic flux linking said coil.

EUGENE HERZOG.